(12) United States Patent
Komatsu

(10) Patent No.: US 6,349,028 B1
(45) Date of Patent: Feb. 19, 2002

(54) ELECTROLYTIC CAPACITOR

(75) Inventor: Akihiko Komatsu, Ina (JP)

(73) Assignee: Rubycon Corporation, Nagano (JP)

( * ) Notice: Subject to any disclaimer, the term of this patent is extended or adjusted under 35 U.S.C. 154(b) by 0 days.

(21) Appl. No.: 09/529,038

(22) PCT Filed: Dec. 1, 1999

(86) PCT No.: PCT/JP99/06741

§ 371 Date: Apr. 5, 2000

§ 102(e) Date: Apr. 5, 2000

(87) PCT Pub. No.: WO00/33337

PCT Pub. Date: Jun. 8, 2000

(30) Foreign Application Priority Data

Dec. 3, 1998 (JP) ........................................... 10-344577

(51) Int. Cl.⁷ ................................................. H01G 9/02
(52) U.S. Cl. ...................... 361/504; 361/508; 361/511; 361/523; 361/519
(58) Field of Search .................... 361/504, 433, 361/512, 511, 518, 530, 536, 517, 519, 508, 525, 311

(56) References Cited

U.S. PATENT DOCUMENTS

| | | | |
|---|---|---|---|
| 4,480,290 A | * 10/1984 | Constanti et al. | ............ 361/433 |
| 4,580,194 A | 4/1986 | Finkelstein et al. | |
| 4,593,343 A | * 6/1986 | Ross | ........................... 361/433 |
| 4,679,124 A | * 7/1987 | Yoshimura et al. | .......... 361/433 |
| 4,822,701 A | * 4/1989 | Ballard et al. | ............... 429/192 |
| 5,057,972 A | * 10/1991 | Ishii | ............................ 361/512 |
| 5,160,653 A | 11/1992 | Clouse et al. | |
| 5,496,481 A | 3/1996 | Liu | |
| 5,628,801 A | * 5/1997 | MacFarlane et al. | ........ 29/25.03 |
| 5,733,661 A | * 3/1998 | Ue et al. | ..................... 428/426 |
| 6,042,740 A | 3/2000 | Uehara et al. | |
| 6,058,006 A | 5/2000 | Yoshioka et al. | |
| 6,285,543 B1 | * 9/2001 | Komatsu et al. | ............ 361/504 |
| 6,288,889 B1 | * 9/2001 | Komatsu et al. | ............ 361/511 |

FOREIGN PATENT DOCUMENTS

| | | |
|---|---|---|
| JP | 59-15374 | 4/1984 |
| JP | 62-145713 | 6/1987 |
| JP | 62-145714 | 6/1987 |
| JP | 62-145715 | 6/1987 |
| JP | 63-14862 | 4/1988 |
| JP | 1-168017 A | 7/1989 |
| JP | 6-136683 | 10/1992 |
| JP | 5-205978 A | 8/1993 |

* cited by examiner

Primary Examiner—Dean A. Reichard
Assistant Examiner—Nguyen T Ha
(74) Attorney, Agent, or Firm—Merchant & Gould P.C.

(57) ABSTRACT

An electrolytic capacitor has a capacitor element formed from an anode foil, a cathode foil opposed to the anode foil and a release paper sandwiched between the anode foil and the cathode foil, and an electrolytic solution, the content of cation(s) in said release paper being not more than 500 ppm. The electrolytic capacitor has a low impedance, excellent low-temperature stability and heat resistance, and good working life characterstics.

7 Claims, 2 Drawing Sheets

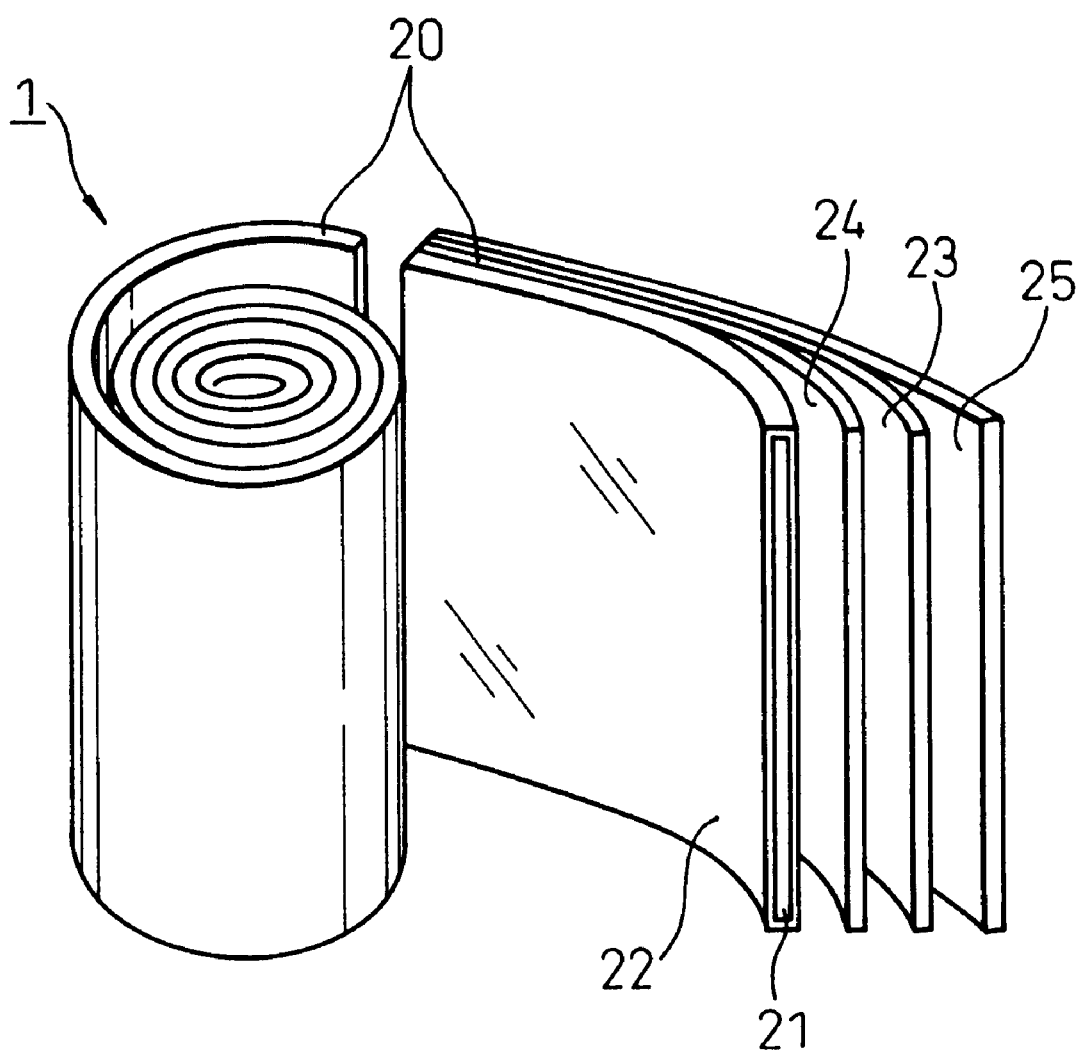

ELECTROLYTIC CAPACITOR

TECHNICAL FILED

The present invention relates to an electrolytic capacitor. More particularly, the present invention relates to a capacitor which has a low impedance, excellent low-temperature stability and heat resistance, and good working life characteristics.

BACKGROUND ART

A capacitor is a general electrical part and is widely used in power circuits and noise filters for digital circuits in various electric and electronic devices.

Various types of electrolytic capacitors are well-known at present, and examples thereof include aluminum electrolytic capacitors, wet tantalum electrolytic capacitors and the like. Among these electrolytic capacitors, particularly excellent effects are expected from an aluminum electrolytic capacitor in the practice of the present invention. Therefore, the present invention will now be described with reference to this kind of electrolytic capacitor. The term "electrolytic capacitor" used herein refers to an aluminum electrolytic capacitor, unless otherwise stated.

A conventional aluminum electrolytic capacitor can typically be produced by using an anode foil, which is made by etching a high-purity aluminum foil thereby to increase its surface area, and anodizing the surface of the aluminum foil to provide an oxidized film, and a cathode foil whose surface has only been etched. The resulting anode foil and cathode foil are disposed opposite each other and a separator (release paper) is interposed between those foils to form a laminate, and then an element (capacitor element) made by winding the laminate is impregnated with an electrolytic solution. The element impregnated with the electrolytic solution is contained in a case or casing (generally made of aluminum), which is then sealed with an elastic sealant, thus completing an electrolytic capacitor. The electrolytic capacitor also includes those other than those with a wound structure.

In the above-described electrolytic capacitor, the characteristics of the electrolytic solution may be a large factor which decides the performance of the electrolytic capacitor. With a size reduction of the electrolytic capacitor, an anode foil or cathode foil having a large surface area produced by etching has been used and the resistivity of the capacitor has recently increased. Therefore, an electrolytic solution having a low resistivity (specific resistance) and high conductivity is required as the electrolytic solution to be used in the electrolytic capacitor.

A conventional electrolytic solution for use in an electrolytic capacitor is generally prepared by dissolving as an electrolyte a carboxylic acid such as adipic acid, benzoic acid, etc. or an ammonium salt thereof into a solvent prepared by adding about 10% by weight or less of water to ethylene glycol (EG) as a principal solvent. Such an electrolytic solution has a specific resistance of about 1.5 Ω.m (150 Ω.cm).

On the other hand, the capacitor is always required to have a low impedance (Z) to sufficiently show the performance thereof. The impedance is determined by various factors and, for example, it is reduced when the electrode area of the capacitor increases. Therefore, the impedance can be reduced, of course, in case of a large-sized capacitor. An approach of reducing the impedance by improving a separator has also been made. However, the specific resistance of the electrolytic solution is a large controlling factor, particularly in a small-sized capacitor.

A low-specific resistance electrolytic solution has recently been developed using an aprotic organic solvent such as GBL (γ-butyrolactone) (see, Japanese Unexamined Patent Publication (Kokai) Nos. 62-145713, 62-145714 and 62-145715). However, the capacitor using this aprotic electrolytic solution is by far inferior in impedance in comparison to a solid capacitor using a known electronic conductor capable of affording a low specific resistance.

The aluminum electrolytic capacitor has poor low-temperature stability, because of use of the electrolytic solution, and a ratio of an impedance at −40° C. to that at 20° C. (100 kHz), Z (−40° C.)/Z (20° C.), is as large as about 40 at present. In addition, there arises a problem that, if water is contained in the electrolytic solution, it can freeze under the operation conditions at a low temperature. Under these circumstances, it is now required to provide an aluminum electrolytic capacitor which has a low impedance and excellent low-temperature stability.

Furthermore, water used as portion of the solvent in the electrolytic solution of the aluminum electrolytic capacitor is a chemically active substance to aluminum constituting the anode foil or cathode foil, and accordingly, there is a problem that water reacts with the anode foil or cathode foil, thereby to generate a hydrogen gas and to drastically deteriorate the characteristics.

On the other hand, in a conventional aluminum electrolytic capacitor, phenomena such as a gradual reduction in the capacitance of the capacitor and an increase in change of other capacitor characteristics are sometimes caused by formation of a hydrate film on the surface of the anode foil and cathode foil in a temperature accelerated test. These phenomena can cause a reduction in the working life of the electrolytic capacitor.

Since the above-described hydrate film is easily formed on the surface of the cathode foil which has not been anodized as compared with the anodized surface of the anode foil, the hydrate film may be caused by the fact that aluminum constituting the anode foil and cathode foil is an active metal. Therefore, a trial of adding an inhibitor for inhibiting formation of the hydrate film in the electrolytic solution, which is directly contacted with the anode film and cathode film, has been made. However, the inhibition effect dissipates and a satisfactory inhibition effect has still to be obtained. Accordingly, it has also been required to provide an electrolytic capacitor, particularly an aluminum electrolytic capacitor, capable of sufficiently preventing a hydrate film forming on the surface of the anode foil and cathode foil.

DISCLOSURE OF THE INVENTION

The present invention is directed to solve the above-mentioned problems of the prior art, and an object thereof is to provide an electrolytic capacitor which has a low impedance, excellent low-temperature stability and heat resistance, and a particularly long working life.

According to the present invention, the above object can be attained by an electrolytic capacitor comprising a capacitor element formed from an anode foil, a cathode foil opposed to the anode foil and a release paper sandwiched between the anode foil and the cathode foil, and an electrolytic solution, characterized in that:

the content of cation(s) in said release paper is not more than 500 ppm.

In general, the release paper used in the electrolytic capacitor contains metal salts (salts of an organic acid and an inorganic acid, such as carboxylic acid, sulfuric acid, and nitric acid) in a low concentration such as about several percent. That is, in the case where these metal salts and ionic compounds are contained in the release paper in a high concentration, when using the release paper in the electrolytic capacitor, metal salts contained in the release paper are eluted into the electrolytic solution in the form of ions, thereby to cause defects capable of exerting a deleterious influence on the capacitor characteristics, such as unstable conductive characteristics of the electrolytic solution and acceleration of the corrosion reaction.

The present inventors have studied currently and widely used release papers and have found that a vigorous reaction, between the electrolytic solution and electrode foils, under high-temperature conditions occurs when using a current release paper containing metal ions (cations) of Ca, Mg, Na, etc. in a concentration capable of exerting no influence on the conductive characteristics of the electrolytic solution, that is, the total amount of several thousand ppm to several percent.

Based on the above findings, the present inventors have further studied and found that drawbacks such as gradual reduction, with time, in the capacitance of the capacitor and large increase in change of the other capacitor characteristics can be prevented by reducing the content of cations in the release paper to a predetermined value or less. The "predetermined value of cations" used herein means the above content of 500 ppm.

The present inventors have also found that the content of cations such as calcium ion in the release paper can be reduced to a level of 500 ppm or less by subjecting the paper to a washing treatment.

Furthermore, they have found that the effects derived from the reduction in content of cations is enhanced when the electrolytic solution used in the electrolytic capacitor consists of an organic solvent and water and the amount of water contained in the organic solvent is large.

Accordingly, the electrolytic solution used in the electrolytic capacitor preferably contains a solvent, containing a highly increased amount of water, which consists of 20 to 80% by weight of an organic solvent and 80 to 20% by weight of water, and at least one electrolyte selected from the group consisting of a carboxylic acid or a salt thereof and an inorganic acid or a salt thereof. The organic solvent to be used in this electrolytic solution is preferably a protic solvent, an aprotic solvent, or a mixture thereof.

The carboxylic acid or salt thereof to be used as the electrolyte is preferably selected from the group consisting of formic acid, acetic acid, propionic acid, butyric acid, p-nitrobenzoic acid, salicylic acid, benzoic acid, oxalic acid, malonic acid, succinic acid, glutaric acid, adipic acid, fumaric acid, maleic acid, phthalic acid, azelaic acid, citric acid and hydroxybutyric acid, and ammonium, sodium, potassium, amine and alkyl ammonium salts thereof. The inorganic acid or salt thereof which is also used as the electrolyte is selected from the group consisting of phosphoric acid, phosophorous acid, hydrophosphorous acid, boric acid, sulfamic acid, and ammonium, sodium, potassium, amine and alkyl ammonium salts thereof. These electrolytes may be used alone or in combination.

Preferably, the electrolytic solution of the present invention further contains at least one additive selected from the group consisting of:

(1) a chelate compound,
(2) saccharides,
(3) hydroxybenzyl alcohol and/or L-glutamic-diacetic acid or a salt thereof,
(4) a nitro compound, and
(5) gluconic acid and/or gluconic lactone.

The electrolytic capacitor of the present invention is preferably an aluminum electrolytic capacitor, and the aluminum electrolytic capacitor is more preferably formed by comprising:

a capacitor element formed by winding an anode foil consisting of an aluminum foil, with an anodized film on the surface of the aluminum foil, and a cathode foil made of the aluminum foil via a release paper so that the surfaces face each other;

an electrolytic solution;

a case containing the capacitor element and the electrolytic solution; and an elastic sealant with which an opening portion of the case is sealed.

BRIEF DESCRIPTION OF THE DRAWINGS

FIG. 2 is a perspective view showing the constitution of a capacitor element of the electrolytic capacitor shown in FIG. 1.

BEST MODE FOR CARRYING OUT THE INVENTION

Figure 1:
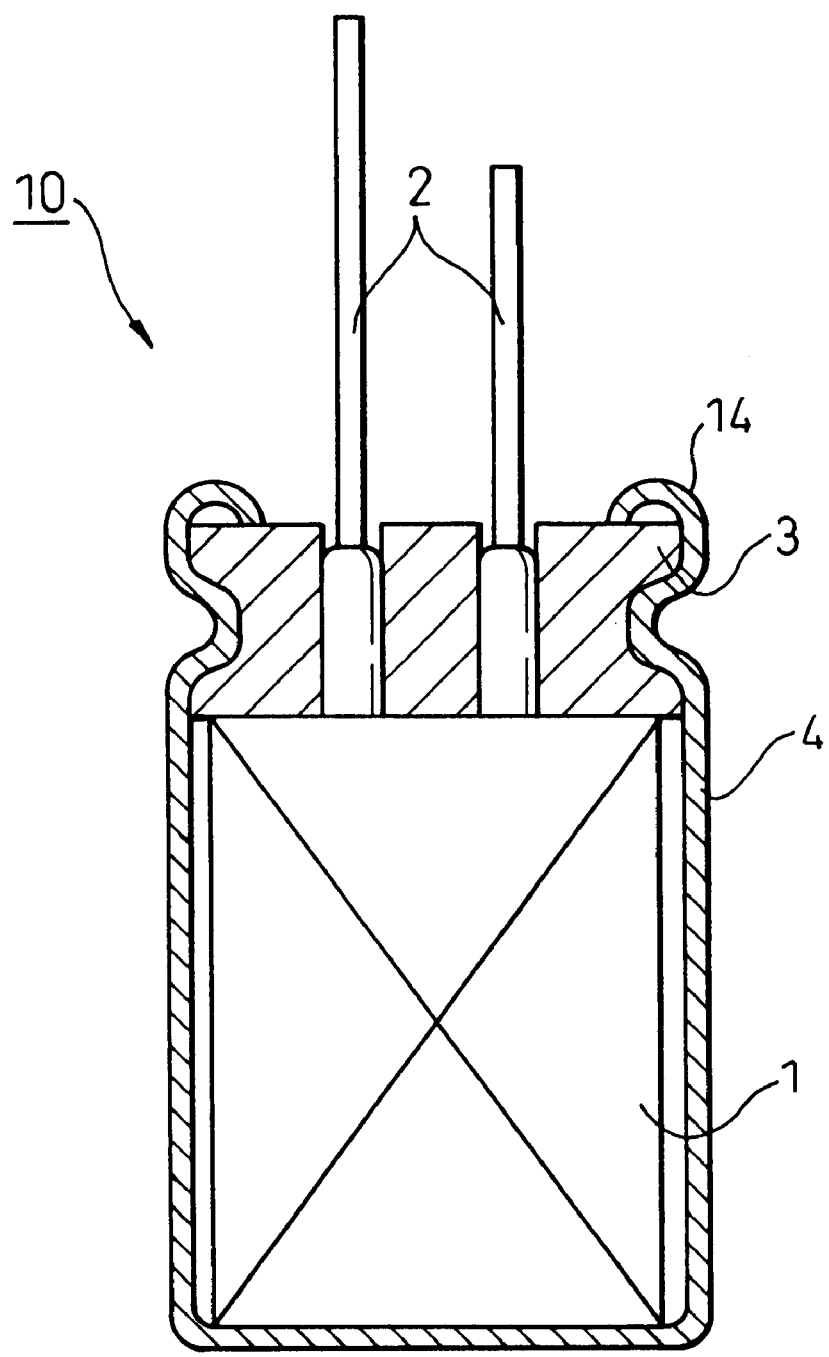
FIG. 1 is a sectional view showing one preferred embodiment of the electrolytic capacitor according to the present invention.

In the electrolytic capacitor according to the present invention, a paper produced by using, as a raw material, a naturally occurring cellulose material, for example, Manila hemp and raw pulp can be used as the release paper. As the release paper, for example, there can be advantageously used a paper produced by passing the raw pulp through a dust removing process, a washing process, a beating process and paper-making process. A paper derived from synthetic fibers can also be used, however, such a paper is not preferred because it is inferior in heat resistance and corrosion of the capacitor is caused by halogen ions contained in the paper.

In the release paper thus produced, the total content of impurities except for α-cellulose as an ingredient of a paper is usually 10,000 ppm. Among these impurities, the content of calcium ions is 3,000 ppm or more. Magnesium ions are mainly contained in a neutral paper and the content thereof is about several tens of ppm.

Impurities in the release paper are gradually extracted in the electrolytic solution during the use of the capacitor. Calcium ions are usually present in the electrolytic solution as cations and are liable to form a gel-like hydrate with aluminum. Therefore, a gel-like hydrate film is liable to be formed on the surface of anode and cathode foils made of aluminum, particularly a cathode film which is not anodized.

According to the present invention, formation of the gel-like hydrate film on the surface of the anode foil and cathode foil can be sufficiently inhibited by using a release paper wherein the content of cations including calcium ions have been reduced to a predetermined value, thus making it possible to prevent a reduction, with time, in capacitance of the aluminum electrolytic capacitor, and to prolong a working life of the electrolytic capacitor.

The release paper used in the present invention, that is, a release paper wherein the content of cations is not more than 500 ppm, can be obtained by carrying out an enhanced or advanced washing operation in any stage of paper-making processes (e.g. a dust removing process, a washing process, a beating process, a paper-making process, etc.). This enhanced washing operation can be carried out by using conventional washing techniques alone or in combination, and examples thereof include a treatment with an acid.

In the electrolytic capacitor of the present invention, the aluminum foil used as the anode foil and cathode foil is preferably an aluminum foil having high aluminum purity of 99% or more. The anode foil can be preferably formed by electrochemically etching the aluminum foil, anodizing it to form an oxidized film on the surface, and attaching a lead tab for connecting an electrode. The cathode film can be formed by etching the aluminum foil and attaching a lead tab for connecting an electrode.

The capacitor element can be obtained by winding the anode and cathode foils thus formed via the above-described release paper while the surfaces face each other.

The aluminum electrolytic capacitor can be obtained by inserting the resulting capacitor element and the electrolytic solution through an opening portion of a closed-end case made of aluminum or the like, thereby to contain them in the case, and sealing the opening portion of the case with an elastic sealant while leads led from the anode foil and cathode foil are allowed to protrude out of the case.

In the electrolytic capacitor of the present invention, as described above, a solvent containing a highly increased amount of water, which consists of a mixture of an organic solvent and water, can be advantageously used as the solvent for dissolving the electrolyte in the electrolytic solution for use in the electrolytic capacitor.

As described above, protic solvents or aprotic solvents may be used alone or in combination, optionally, as the organic solvent. Examples of a preferred protic solvent include alcohol compounds. Typical examples of the alcohol compound used advantageously herein include, but are not limited to, monohydric alcohol such as ethyl alcohol, propyl alcohol, and butyl alcohol; dihydric alcohol (glycol) such as ethylene glycol, diethylene glycol, triethylene glycol, and propylene glycol; and trihydric alcohol such as glycerin. Examples of preferred aprotic solvent include lactone compound. Typical examples of the lactone compound used advantageously herein include, but are not limited to, γ-butyrolactone and other intramolecular polarizable compounds. When using at least one selected from the protic and aprotic solvents in the practice of the present invention, more specifically, one protic solvent may be used, one aprotic solvent may be used, plural protic solvents may be used, plural aprotic solvents may be used, or, alternatively, a mixed solvent of at least one protic solvent and at least one aprotic solvent may be used.

In the electrolytic solution of the present invention, water is added, in addition to the above-described organic solvents, as the solvent component. Particularly, the present invention differs from a conventional electrolytic solution because a comparatively large amount of water is used in the present invention. According to the present invention, by using such a solvent, the solidifying point of the solvent is lowered, thereby making it possible to improve the specific resistance characteristics at low temperature of the electrolytic solution and to realize good low-temperature stability expressed by a ratio of a resistivity at low temperature to that at normal temperature. A content of water in the electrolytic solution is preferably within a range from 20 to 80% by weight, and an organic solvent is contained as a balance. When the content of water is smaller than 20% by weight and when the content of water exceeds 80% by weight, the degree of depression in solidifying point of the electrolytic solution becomes insufficient, thereby making it difficult to obtain good low-temperature stability of the electrolytic capacitor. Preferred content of water in the solvent is within a range from 30 to 80% by weight, and most preferred content of water in the solvent is within a range from 45 to 80% by weight.

As the electrolyte in the electrolytic solution of the present invention, a carboxylic acid or a salt thereof, and an inorganic acid or a salt thereof may be used. These electrolyte components may be used alone, or two or more kinds of them may be used in combination.

Examples of the carboxylic acid which can be used as the electrolyte component include, but are not limited to, monocarboxylic acid such as formic acid, acetic acid, propionic acid, butyric acid, p-nitrobenzoic acid, salicylic acid, and benzoic acid; and dicarboxylic acid such as oxalic acid, malonic acid, succinic acid, glutaric acid, adipic acid, fumaric acid, maleic acid, phthalic acid, and azelaic acid. Carboxylic acids having a functional group such as hydroxyl group, for example, citric acid and hydroxybutyric acid can also be used.

Examples of the inorganic acid which can also be used as the electrolyte component include, but are not limited to, phosphoric acid, phosphorous acid, hypophosphorous acid, boric acid and sulfamic acid.

As the salt of the above-described carboxylic acid or inorganic acid, various salts can be used. Suitable salts include, for example, ammonium salt, sodium salt, potassium salt, amine salt and alkyl ammonium salt. Among these salts, an ammonium salt is preferably used.

In addition, when using the inorganic acid or salt thereof as the electrolyte in the practice of the present invention, depression in solidifying point of the electrolytic solution can be expected, thereby making it possible to contribute to a further improvement in low-temperature stability of the electrolytic solution. The use of the inorganic acid or salt thereof is noticeable in that the hydrogen gas absorbability (described in detail hereinafter), derived from the nitro compound particularly used in the present invention, can be maintained for a long period of time.

According to the present inventors' study, by using the electrolyte such as inorganic acid or salt thereof in combination with the above-described carboxylic acid or salt thereof, an effect of remarkably prolonging a working life of the electrolytic capacitor as compared with the case where they are used alone can be obtained. Furthermore, an inorganic acid-based electrolyte has hitherto been used exclusively in a medium to high-voltage (160 to 500 volts) type electrolytic capacitor in a conventional electrolytic capacitor in view of the conductivity. However, when using electrolytes in combination, as in the present invention, the electrolyte can also be used advantageously in a low-voltage (less than 160 volt) type electrolytic capacitor.

The amount of the electrolyte used in the electrolytic solution of the present invention can be appropriately determined depending on various factors such as characteristics required of the electrolytic solution and the capacitor finally obtained, kind, compositions and amount of the solvent, and kind of the electrolyte.

In the electrolytic solution of the present invention, a more remarkable effect can be obtained by adding the following specific additives (1) to (5) to an electrolytic solution of the above-described specific compositions, that is, an electrolytic solution comprising an aqueous mixed solvent consisting of 20 to 80% by weight of an organic solvent and 80 to 20% by weight of water, and at least one electrolyte selected from the group consisting of a carboxylic acid or a salt thereof and an inorganic acid or a salt thereof.

(1) A chelate compound, for example, ethylenediamine-N,N,N',N'-tetraacetic acid (EDTA), trans-1,2-diaminocyclohexane-N,N,N',N'-tetraacetic acid, monohydrate (CyDTA), N,N-bis(2-hydroxyethyl)glycine (DHEG), ethylenediamine-N,N,N',N'-tetrakis (methylenephosphonic acid) (EDTPO), diethylenetriamine-N,N,N',N'',N''-pentaacetic acid (DTPA), 1,3-diamino-2-hydroxypropane-N,N,N',N'-tetraacetic acid (DPTA-OH), ethylnediamine-N,N'-diacetic acid (EDDA), ethylenediamine-N,N'-bis (methylenephosphonic acid), hemihydrate (EDDPO), O,O'-bis(2-aminoethyl)ethyleneglycol-N,N,N',N'-tetraacetic acid (GEDTA), and N-(2-hydroxyethyl) ethylenediamine-N,N',N'-triacetic acid (EDTA-OH). Generally, the chelate compound is preferably added in the amount within a range from 0.01 to 3% by weight. Such a chelate compound can exert effects such as prolongation of a working life due to inhibition of the hydration reaction of an aluminum (Al) electrode foil of a low-impedance capacitor, improvement in low-temperature stability of an electrolytic capacitor (a change between an impedance at normal temperature and that at low temperature decreases because the solvent has compositions close to those corresponding to a non-frozen state), and improvement in corrosion resistance.

(2) Saccharides, for example, glucose, fructose, xylose, and galactose. Generally, the saccharides are preferably added in the amount within a range from 0.01 to 5% by weight. These saccharides can exert effects such as prolongation of a working life due to inhibition of the hydration reaction of an aluminum electrode foil of a low-impedance capacitor, inhibition of decomposition or activation of an electrolyte (e.g. carboxylic acid) due to the addition of saccharides, and improvement in low-temperature stability of an electrolytic capacitor (a change between an impedance at normal temperature and that at low temperature decreases because the solvent has compositions close to those corresponding to a non-frozen state).

(3) Hydroxybenzyl alcohol, for example, 2-hydroxybenzyl alcohol, L-glutamic-diacetic acid or a salt thereof. Generally, this additive is preferably added in the amount within a range from 0.01 to 5% by weight. Such an additive can exert effects such as prolongation of a working life due to inhibition of the hydration reaction of an aluminum electrode foil of a low-impedance capacitor, and improvement in low-temperature stability of an electrolytic capacitor (a change between an impedance at normal temperature and that at low temperature decreases because the solvent has compositions close to those corresponding to a non-frozen state).

(4) A nitro compound, for example, a series of nitro compounds, for example, nitrophenol such as p-nitrophenol, etc., nitrobenzoic acid such as p-nitrobenozic acid, dinitrobenzoic acid, etc., nitroacetophenone such as p-nitroacetophenone, etc., and nitroanisole. In general, the nitro compound is preferably added in the amount within a range from 0.01 to 5% by weight. The nitro compound can also have a remarkable hydrogen gas absorption effect and a function of inhibiting corrosion of the element caused by a function of a halogenated hydrocarbon used on washing of a printed circuit board, for example, trichloroethane (halogen capturing function in other words).

An excellent hydrogen gas absorption function provided by the nitro compound could also be confirmed in a relation with the electrolyte used in combination. In a conventional electrolytic solution, the procedure of adding only one nitro compound to only a carboxylic acid-based electrolyte, or adding only one nitro compound to only an inorganic acid-based electrolyte has been employed. However, satisfactory hydrogen gas absorption function cannot be obtained by the procedure in case where the amount of water contained in the solvent is large, and the same results are obtained in an electrolytic solution wherein both of a carboxylic acid-based electrolyte and an inorganic acid-based electrolyte are present. In case of the electrolytic solution of the present invention, even if only one nitro compound is used, the hydrogen gas absorbability could be maintained for a longer period of time than the case where nitro compounds are used alone, surprisingly, even in case of the carboxylic acid/inorganic acid mixed electrolytic solution.

(5) Gluconic acid, gluconic lactone and the like. Generally, this kind of the additive is preferably added in the amount within a range from 0.01 to 5% by weight. Gluconic acid and gluconic lactone can further exert remarkable effects such as an improvement in corrosion resistance, in addition to functions, which are specific to the present invention, such as a prolongation of a working life of an electrolytic capacitor, improvement in low-temperature stability and excellent hydrogen gas absorption function, by containing them to the electrolytic solution of the present invention.

In addition to the above-described additives, conventional additives in the field of the aluminum electrolytic capacitor and other electrolytic capacitors may also be added. Preferred conventional additives include, for example, mannitol, a silane coupling agent, a water-soluble silicone and a polyelectrolyte.

The electrolytic capacitor of the present invention is preferably an aluminum electrolytic capacitor, and it is formed so that a capacitor element formed by winding an anode foil, wherein the surface of an etched aluminum foil is anodized, and a cathode foil made of the etched aluminum foil via a release paper so that surfaces of the both face each other, and an electrolytic solution of the present invention are contained in a case and, furthermore, an opening portion of the case containing the capacitor element is sealed with an elastic sealant.

FIG. 1 is a sectional view showing one preferred embodiment of the electrolytic capacitor of the present invention, and FIG. 2 is a perspective view enlarged partially in the thickness direction, which shows a capacitor element of the electrolytic capacitor shown in FIG. 1. It should be noted that although the embodiment shown in the drawings is an electrolytic capacitor with a wound structure, electrolytic capacitors other than the electrolytic capacitors with wound structures are included in the present invention.

An electrolytic capacitor 10 shown in the drawing is a chip-shaped aluminum electrolytic capacitor and has such a structure that a capacitor element 1 impregnated with an electrolytic solution is contained in a metal case 4 and an opening portion of the case 4 is sealed with a sealant 3. The capacitor element 1 contained in the metal case is in the form of a wound sheet-like laminate 20. The laminate 20 comprises, as shown in the drawing, an aluminum foil (anode) 21 having an aluminum oxide film 22 over the entire surface thereof, an aluminum foil (cathode) 23, a first release paper (release paper) 24 interposed between these electrodes, and a second release paper (release paper) 25. The first release paper 24 and the second release paper 25 may be the same or different. These two release papers are preferably made of the same material in view of simplification of the production process and reduction of the production cost. The second release paper may be formed from an insulating film which is usually used in the field of the electrolytic capacitor, if necessary. The capacitor element 1 is impregnated with an electrolytic solution.

In the electrolytic capacitor shown in the drawing, the sealant 3 has a lead wire-penetrating hole for inserting a lead wire 2, thereby to conduct sealing, therein. The end of the opening portion of the case 4 is provided with a curl 14 to enhance the sealing strength of the sealant 3.

The electrolytic capacitor shown in FIGS. 1 and 2 can be produced, for example, by the following procedure. First, an anode foil, wherein an oxidized film is provided over the entire surface by anodizing the surface of a high-purity aluminum foil as a raw material, and a cathode film whose surface area is increased by etching the surface are made. Then, the resulting anode foil and cathode foil are disposed facing each other and a separator (release paper) is interposed between those films to form a laminate, thereby making an element with a structure obtained by winding this laminate, that is, a capacitor element. Subsequently, the resulting capacitor element is impregnated with an electrolytic solution and the capacitor element impregnated with the electrolytic solution is contained in a case (generally made of aluminum), as described above, and then an opening portion of the case is sealed with a sealant. Two lead wires are inserted into a lead wire-penetrating hole of the sealant, thereby to completely seal it so that leakage of the electrolytic solution does not occur.

The constitution of the electrolytic capacitor according to the present invention will be described in more detail. First, constituent elements of the anode foil and cathode foil are as described above. As described above, the release paper can play an important role in the present invention and its constituent element is also as described above.

The sealant used in the electrolytic capacitor of the present invention can be formed from various conventional materials as far as the material has high hardness and proper rubber elasticity, and it is also impermeable to an electrolytic solution and has good airtightness for the sealant. Preferred sealant material includes, for example, elastic rubber such as natural rubber (NR), styrene-butadiene rubber (SBR), ethylene-propylene terpolymer (EPT), and isobutylene-isoprene rubber (IIR). The isobutylene-isoprene rubber (IIR) is preferably used because the airtightness is high and the electrolytic solution does not penetrate in the form of vapor. Vulcanized IIR having more excellent heat resistance, for example, sulfur-vulcanized, quinoid-vulcanized or resin-vulcanized IIR is used more preferably, and the resin-vulcanized IIR is particularly preferred.

Further, in the practice of the present invention, a hybrid material obtained by laminating a resin material plate having sufficient airtightness and strength (e.g. fluorine-contained resin plate such as PTFE plate) can be advantageously used in place of the above-described sealant material.

EXAMPLES

The following Examples further illustrate the present invention in detail. These Examples are to be construed in all respects as illustrative and not restrictive. Note in the following Examples that the content of cations in the release paper was measured in the following procedure. A sample obtained by absolute drying of a release paper was ashed in a crucible and the ashed sample was dissolved in an aqueous nitric acid solution, and then the content of cations was determined by an atomic absorption spectrophotometer.

Example 1

An aluminum electrolytic capacitor with a wound structure was produced in accordance with the following procedure.

First, an aluminum foil was electrochemically etched, followed by anodizing to form an anodized film over the entire surface of the aluminum foil, and then a lead tab for leading an electrode was attached to make an aluminum-made anode electrode. Another aluminum foil was also electrochemically etched and a lead tab for leading an electrode was attached to make an aluminum-made cathode electrode. Subsequently, a capacitor element was made by interposing a release paper between the anode electrode and the cathode electrode, followed by winding. The release paper used herein is a paper made by using Manila hemp as a raw material and the content of cations was as small as 489 ppm because of the washing step in the paper-making process. Then, the capacitor element was impregnated with an electrolytic solution of compositions described below and contained in an aluminum closed-end case so that the lead tab for leading an electrode protrudes out of the case, and then an opening of this case was sealed with an elastic sealant to make an electrolytic capacitor with a wound structure (6.3 WV-1,000 $\mu$F).

| | |
|---|---|
| Ethylene glycol | 45% by weight |
| Water | 40% by weight |
| Ammonium adipate | 14.4% by weight |
| EDTA | 0.5% by weight |
| D-gluconic acid-δ-lactone | 0.1% by weight |

To evaluate the characteristics of the aluminum electrolytic capacitor, an initial value (characteristic value immediately after making a capacitor) and a characteristic value after the capacitor was allowed to stand at high temperature (lapse of 3,000 hours at 105° C.) under application of a rated voltage were measured with respect to the capacitance, tan δ and leakage current. As a result, measured values as described in Table 1 below were obtained.

Examples 2 and 3

The same procedure as in Example 1 was repeated, except that the content of cations of the release paper used was changed to 280 ppm (Example 2) or 120 ppm (Example 3) in these examples. The results as described in Table 1 below were obtained.

Comparative Examples 1 to 3

The same procedure as in Example 1 was repeated, except that the content of cations of the release paper used was changed to 1,121 ppm (Comparative Example 1), 1,932 ppm (Comparative Example 2) or 3,013 ppm (Comparative Example 3) for comparison purpose in these comparative examples. The results as described in Table 1 below were obtained.

TABLE 1

| Example No. | Content of cations (ppm) | Initial value | | | After 3,000 hours at 105° C. | | | |
|---|---|---|---|---|---|---|---|---|
| | | Capacitance [μF] | Tanδ [%] | Leakage current [μA] | Capacitance [μF] | Tanδ [%] | Leakage current [μA] | Appearance |
| Comp. Example 1 | 1121 | 991 | 6.1 | 22.0 | 634 | 33.5 | 65.1 | case was swelled |
| Comp. Example 2 | 1932 | 991 | 8.0 | 23.6 | impossible to measure due to drastic reduction in capacitance | | | |
| Comp. Example 3 | 3013 | 995 | 7.0 | 18.8 | impossible to measure due to drastic reduction in capacitance | | | |
| Example 1 | 489 | 992 | 6.0 | 22.1 | 952 | 8.1 | 18.2 | satisfactory |
| Example 2 | 280 | 991 | 5.9 | 23.1 | 943 | 7.8 | 12.1 | satisfactory |
| Example 3 | 120 | 995 | 6.1 | 20.8 | 960 | 7.6 | 11.8 | satisfactory |

As is apparent from the results shown in Table 1, there is no significant difference in initial value between the electrolytic capacitors of Comparative Examples wherein the content of cations exceeds 1,000 ppm and the electrolytic capacitor of the present invention wherein the content is below 500 ppm. However, there is a large change in characteristics of the capacitor before and after a high-temperature load test. According to the present invention, the characteristics of a working life can be markedly improved.

The electrolytic capacitor subjected to the high-temperature load test was disassembled and the surface of anode and cathode foils was observed using a microscope. As a result, a gel film was observed on the surface of the anode and cathode foils in the electrolytic capacitor of Comparative Examples and, furthermore, a remarkable gel film was recognized on the surface of the cathode foil as compared with the case of the anode foil. On the other hand, no gel film was observed on the surface of the anode and cathode foils in the electrolytic capacitors of the present invention.

Industrial Applicability

As described above, according to the present invention, formation of a hydrate film (gel film) on the surface of anode and cathode foils of an electrolytic capacitor, which is caused by a cation ingredient such as calcium ions contained in a release paper, can be inhibited. Therefore, according to the present invention, there is provided an electrolytic capacitor with high reliability, particularly an aluminum electrolytic capacitor, which has a low impedance, excellent low-temperature stability and heat resistance, and good characteristics of working life.

What is claimed is:

1. An electrolytic capacitor comprising a capacitor element formed from an anode foil, a cathode foil opposed to the anode foil and a release paper sandwiched between the anode foil and the cathode foil, and an electrolytic solution, said release paper having not more than 500 ppm of at least one cation, said electrolytic solution containing a solvent consisting of 20 to 80% by weight of an organic solvent and 80 to 20% by weight of water, and at least one electrolyte selected from the group consisting of a carboxylic acid or a salt thereof and an inorganic acid or a salt thereof.

2. The electrolytic capacitor according to claim 1, wherein said at least one cation is derived from a raw material or a production process of the release paper and a content thereof is reduced to a level of aforesaid content as a result of a washing treatment.

3. The electrolytic capacitor according to claim 1, wherein said organic solvent is a protic solvent, an aprotic solvent, or a mixture thereof.

4. The electrolytic capacitor according to claim 1, wherein said carboxylic acid or salt thereof is selected from the group consisting of formic acid, acetic acid, propionic acid, butyric acid, p-nitrobenzoic acid, salicyclic acid, benzoic acid, oxalic acid, malonic acid, succinic acid, glutaric acid, adipic acid, fumaric acid, maleic acid, phthalic acid, azelaic acid, citric acid and hydroxybutyric acid, and ammonium, sodium, potassium, amine and alkyl ammonium salts thereof.

5. The electrolytic capacitor according to claim 1, wherein said inorganic acid or salt thereof is selected from the group consisting of phosphoric acid, phosphorous acid, hypophosphorous acid, boric acid, sulfamic acid, and ammonium, sodium, potassium, amine and alkyl ammonium salts thereof.

6. The electrolytic capacitor according to claim 1, wherein said electrolytic solution further contains at least one additive selected from the group consisting of:

(1) a chelate compound, (2) saccharides, (3) hydroxybenzyl alcohol and/or L-glutamic-diacetic acid or a salt thereof, (4) a nitro compound, and (5) gluconic acid and/or gluconic lactone.

7. The electrolytic capacitor according to claim 1, which is an aluminum electrolytic capacitor.

* * * * *